United States Patent
Shi et al.

(10) Patent No.: US 10,301,477 B2
(45) Date of Patent: May 28, 2019

(54) SUPERHYDROPHILIC COATING COMPOSITION

(71) Applicant: Behr Process Corporation, Santa Ana, CA (US)

(72) Inventors: Jinzhen Shi, Fountain Valley, CA (US); Ming-Ren Tarng, Irvine, CA (US); Jigui Li, Irvine, CA (US); Shuxue Zhou, Shanghai (CN); Limin Wu, Shanghai (CN); Ling Yang, Shanghai (CN)

(73) Assignee: Behr Process Corporation, Santa Ana, CA (US)

( * ) Notice: Subject to any disclaimer, the term of this patent is extended or adjusted under 35 U.S.C. 154(b) by 207 days.

(21) Appl. No.: 13/838,501

(22) Filed: Mar. 15, 2013

(65) Prior Publication Data

US 2014/0275374 A1    Sep. 18, 2014

(51) Int. Cl.
| | |
|---|---|
| *C08K 3/00* | (2018.01) |
| *C09D 1/00* | (2006.01) |
| *C09D 5/00* | (2006.01) |
| *C09D 5/16* | (2006.01) |
| *C09D 7/40* | (2018.01) |
| *C09D 183/02* | (2006.01) |

(52) U.S. Cl.
CPC ............. *C09D 5/00* (2013.01); *C09D 1/00* (2013.01); *C09D 5/16* (2013.01); *C09D 7/67* (2018.01); *C09D 183/02* (2013.01); *C08K 3/00* (2013.01)

(58) Field of Classification Search
CPC ...... C09D 7/1266; C09D 133/10; C09D 1/04; C09D 183/02
See application file for complete search history.

(56) References Cited

U.S. PATENT DOCUMENTS

| | | | | |
|---|---|---|---|---|
| 4,914,012 A | * | 4/1990 | Kawai | 430/536 |
| 5,780,530 A | * | 7/1998 | Mizutani et al. | 523/209 |
| 6,777,070 B1 | * | 8/2004 | Murata | C08F 259/08 428/323 |
| 7,572,486 B2 | * | 8/2009 | Takahashi et al. | 427/384 |
| 7,842,352 B2 | | 11/2010 | Gemici et al. | |
| 7,959,980 B2 | | 6/2011 | Nakajima et al. | |
| 8,013,055 B2 | | 9/2011 | Niguma et al. | |
| 8,153,233 B2 | | 4/2012 | Sheng et al. | |
| 8,568,870 B2 | * | 10/2013 | Imai | B01J 35/004 428/328 |
| 2004/0204314 A1 | | 10/2004 | Escaffre et al. | |
| 2006/0070551 A1 | | 4/2006 | Kanamori et al. | |
| 2008/0268229 A1 | | 10/2008 | Lee et al. | |
| 2009/0286068 A1 | * | 11/2009 | Niguma et al. | 428/327 |
| 2010/0298120 A1 | | 11/2010 | Tanaka et al. | |
| 2012/0285528 A1 | * | 11/2012 | Takanohashi et al. | 136/256 |

FOREIGN PATENT DOCUMENTS

| | | |
|---|---|---|
| EP | 2 163 304 A2 | 3/2010 |
| EP | 2 292 702 A1 | 9/2011 |
| JP | 2002348525 A * | 12/2002 |
| JP | 2010018767 A * | 1/2010 |
| WO | 2005/083013 A1 | 9/2005 |
| WO | 2009/006324 A1 | 1/2009 |
| WO | 2009/029854 A1 | 3/2009 |
| WO | 2009/097004 A1 | 8/2009 |
| WO | WO 2010104146 A1 * | 9/2010 |

OTHER PUBLICATIONS

Machine translated English equivalent of JP 2010018767 (Jan. 2010, 22 pages).*
Machine translated English equivalnet of JP 2002-348525 (Dec. 2002, 12 pages).*
Park, S. et al., "Organic and inorganic binder-coating properties for immobilization of photocatalyic ZnO nanopowders", Res Chem Intermed, v. 36, 2010, pp. 819-825.
International Search Report dated Aug. 12, 2014 in PCT Appn. PCT/US2014/021511, Filed Mar. 7, 2014, 5 pgs.

* cited by examiner

Primary Examiner — Brieann R Johnston
(74) Attorney, Agent, or Firm — Brooks Kushman P.C.

(57) ABSTRACT

A composition for forming a hydrophilic coating includes an organic binder having an average particle size from about 1 to about 100 nm and an inorganic binder having an average particle size from about 1 to about 40 nm. The composition further includes an inorganic photocatalyst that catalyzes an oxidation-reduction reaction. Characteristically, the photocatalyst includes a photocatalytic metal oxide having an average particle size from about 1 to about 50 nm. Advantageously, coatings formed from the composition have improved stain resistance, low contact angle, and resistance to dirt adherence, while maintaining a clear optical character.

21 Claims, 4 Drawing Sheets

SUPERHYDROPHILIC COATING COMPOSITION

TECHNICAL FIELD

The present invention relates to a hydrophilic coating, and in particular to a clear hydrophilic coating having superior dirt pick-up resistance.

BACKGROUND

The surface characteristics of a substrate can be altered by a variety of means, perhaps most readily by the application of a clear-coat layer. For example, the water permeability, dirt adherence resistance, wettability, and clarity properties of materials can be modified by suitable treatment of their surface. A number of compositions for altering the surface properties of substrates have been developed. Water repellant, oil repellent, stain resistant, anti-microbial, anti-static, anti-fog, anti-scratch and water absorptive surface treatments and coatings are well known commercial products.

Stain resistance, water repellency, and resistance to dirt adherence are important features in a clear-coat paint composition. Conventional coating compositions have chalking and whitening problems after exposure to the sun. Another issue with conventional coating compositions is coating compatibility and stability which negatively affect the clear coats ability to maintain its clarity over its lifetime. For example, clear-coat compositions composed of micron-size particles are prone to flocculation which can negatively alter the particle size distribution, and thus the assembly of the particles during the film drying process. This eventually results in coating film whitening and chalking. Although prior art methods and coating compositions work reasonably well, improvements are nonetheless desired.

Accordingly, there is a need for improved compositions of hydrophilic clear coating that have improved stain resistance, water repellency, and resistance to dirt adherence, while maintaining a clear character.

SUMMARY

The present invention solves one or more problems of the prior art by providing in at least one embodiment, a composition for forming a hydrophilic coating. The composition includes an organic binder having an average particle size from about 1 to about 100 nm and an inorganic binder having an average particle size from about 1 to about 40 nm. The composition further includes an inorganic photocatalyst that catalyzes an oxidation-reduction reaction. Characteristically, the photocatalyst includes a photocatalytic metal oxide having an average particle size from about 1 to about 50 nm. Advantageously, coatings formed from the composition have improved stain resistance, water repellency, and resistance to dirt adherence, while maintaining a clear optical character after exposure to sunlight.

In another embodiment, an article coated with a layer formed from the composition set forth above is provided. The article includes a substrate and a coating disposed over the substrate. The coating includes an organic binder having an average particle size from about 1 to about 100 nm, an inorganic binder having an average particle size from about 1 to about 40 nm, and an inorganic photocatalyst that catalyzes an oxidation-reduction reaction. The photocatalyst has a photocatalytic metal oxide having an average particle size from about 1 to about 50 nm. Characteristically, the coating has a contact angle less than about 10 degrees.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refer to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "binder" as used in at least one embodiment refers to the material that has the binding capability to form a film and contribute to the film integrity and mechanical properties.

The term "air-void" as used in at least one embodiment refers to the volume of void or empty space contained within the composition for forming a hydrophilic coating.

The term "air-void density" as used in at least one embodiment refers to the number of air-voids per volume, or in the case of cross sections, the number of air-voids per area.

The term "particle-size" as used in at least one embodiment refers to the average size of each particle.

The term "Feret diameters" as used in at least one embodiment refers to the distance between two tangents parallel to the opposite sides of a particle or pore.

The term "aspect ratio" as used in at least one embodiment refers to the ratio as the ratio of the minimum and maximum Feret diameters of a pore, particle, or air-void. For example, the aspect ratio of a spherical pore is 1. The aspect ratio for a completely compressed pore is nearly zero in the idealized case.

The term "photocatalyst" as used in at least one embodiment refers to a substance that catalyzes an oxidation-reduction reaction by light irradiation.

The term "superhydrophilicity" as used in at least one embodiment refers to a coating or film having a contact angle less than 5 degrees at room temperature.

In an embodiment of the present invention, a composition for forming a hydrophilic coating is provided. In particular, a paint composition for forming a clear-coat is provided. The composition includes an organic binder, an inorganic binder, and an inorganic photocatalyst, each of which include nano-sized particles. In a refinement, the nano-sized particles for each of these components have an aspect ratio from 0.1 to 1. Typically, each of these components has an average particle size less than about 100 nm. In a refinement, each of these components has a maximum Feret diameter less than about 100 nm. In another refinement, the composition also includes water in an amount from about 0 to 50 weight percent of the total weight of the composition. In still another refinement, water is present in an amount from 5 to 40 weight percent of the total weight of the composition. The composition is useful for forming a coating on a substrate with a low contact angle. In one refinement, the contact angle of such a coating at 25° C. is less than 30 degrees at room temperature (i.e., 25° C.). In another, refinement, the contact angle of such a coating at 25° C. is less than 10 degrees at room temperature. In still another refinement, the contact angle of such a coating at 25° C. is less than 5 degrees. Advantageously, the low contact angle coatings formed from the composition possess excellent stain resistance, dirt adherence resistance, clarity, and antifogging property even after sun exposure.

In one variation, the organic binder includes acrylics, polyurethane dispersions, silicone emulsions, solution polymers, and combinations thereof. Examples of suitable organic binders include, but are not limited to, styrene acrylate dispersion UCAR™ latex R-64 (50 nm), urethane-acrylic hybrid dispersion Sancure® XPD-2623, aliphatic polyurethane dispersion NeoRez® R-972, acrylic dispersion Interkem® A510 (20~30 nm), Interkem® A520 (20~30 nm), fine particle size colloidal dispersion Joncryl® 95-E (45 nm), and Hexion Ultrafine® PR3500. In a refinement, the amount of organic binder is about 20 to about 80 percent of the combined weight of the inorganic binder, organic binder, and photocatalyst. In another refinement, the amount of organic binder is from about 30 to about 70 percent of the combined weight of the inorganic binder, organic binder, and photocatalyst. In still another refinement, the amount of organic binder is from about 40 to about 60 percent of the combined weight of the inorganic binder, organic binder, and photocatalyst. As set forth above, the organic binder includes nano-sized particles. In a refinement, the organic binder includes particles having an average particle size greater than or equal to, in increasing order of preference, 1 nm, 10 nm, 20 nm, 30 nm, and 40 nm. In another refinement, the organic binder includes particles having an average particle size less than, in increasing order of preference, 100 nm, 90 nm, 80 nm, 70 nm, 60 nm, and 50 nm. In still another refinement, the organic binder includes particles having a maximum Feret diameter greater than or equal to, in increasing order of preference, 1 nm, 10 nm, 20 nm, 30 nm, and 40 nm. In yet another refinement, the organic binder includes particles having an average particle size less than, in increasing order of preference, 100 nm, 90 nm, 80 nm, 70 nm, 60 nm, and 50 nm.

In another variation, the inorganic binder includes colloidal silica, silica sol, silicate, and combinations thereof. Examples of inorganic binders include, but are not limited to, Bindzil® 1440, Bindzil® 2040, Bindzil® CC-401 by Akzo Nobel, Ludox® AS-30, Ludox® HS-40, Ludox® TM-50 by W. R. Grace, Nyacol 2040 by Nyacol Nano Technologies Inc., Nanocryl® C series, Nanopox® C series by Evonik, Aerodisp® series by Degussa, PQ® soluble Silicates, Snowtex® colloidal silicas by Nissan Chemical, and combinations thereof. In a refinement, the amount of inorganic binder is about 20 to about 80 weight percent of the composition for forming a hydrophilic coating. In another refinement, the amount of inorganic binder is about 30 to about 70 percent of the combined weight of the inorganic binder, organic binder, and photocatalyst. In another refinement, the amount of inorganic binder is about 40 to about 60 percent of the combined weight of the inorganic binder, organic binder, and photocatalyst. In still another refinement, the amount of inorganic binder is about 20 to about 50 percent of the combined weight of the inorganic binder, organic binder, and photocatalyst. As set forth above the inorganic binder includes nano-sized particles. In a refinement, the inorganic binder has an average particle size from about 1 to about 40 nm. In a refinement, the inorganic binder includes particles having an average particle size greater than or equal to, in increasing order of preference, 1 nm, 10 nm, 20 nm, and 30 nm. In another refinement, the inorganic binder includes particles having an average particle size less than, in increasing order of preference, 70 nm, 60 nm, and 50 nm. In still another refinement, the inorganic binder includes particles having a maximum Feret diameter greater than or equal to, in increasing order of preference, 1 nm, 10 nm, 20 nm, and 30 nm. In yet another refinement, the inorganic binder includes particles having an average particle size less than, in increasing order of preference, 80 nm, 70 nm, 60 nm, and 50 nm.

The organic-inorganic composition is also characterized as having a weight ratio of the inorganic binder to organic binder being about 1:2 to about 4:1. In a refinement, the weight ratio of the inorganic binder to organic binder is about 1:1 to about 3:1. In another refinement, the weight ratio of the inorganic binder to organic binder is about 3:2 to about 2:1.

In another variation, the inorganic photocatalyst includes a photocatalytic metal oxide. Examples of suitable metal oxides include, but are not limited to, silicon dioxide, aluminum oxide, antimony oxide, titanium oxide, indium oxide, tin oxide, zirconium oxide, lead oxide, iron oxide, calcium silicate, magnesium oxide, niobium oxide, cerium oxide and combinations thereof. In another embodiment, the metal oxide is titanium oxide. Titanium oxide and/or zinc oxide are particularly useful as inorganic photocatalysts. Titanium oxide ($TiO_2$) is particularly useful due to its low toxicity and chemical stability. Moreover, the titanium oxide may be in any of the known crystalline forms, anatase, rutile and brookite. In the present context, the photocatalyst catalyzes or induces an oxidation-reduction reaction under irradiation by light, and in particular ultraviolet light. Such photocatalytic activity of a material can be determined by measuring the decomposition degree of an organic substance such as a dye on the surface of the material when the surface is light irradiated. A surface that has photocatalytic activity develops excellent decomposition activity for staining organic substances and stain resistance against staining organic substances.

In a refinement, inorganic photocatalyst is present in an amount from about 2 to about 20 percent of the combined weight of the inorganic binder, organic binder, and photocatalyst. In another refinement the amount of inorganic photocatalyst is from about 5 to about 15 percent of the combined weight of the inorganic binder, organic binder, and photocatalyst. As set forth above, the photocatalytic metal oxide includes nano-sized particles. In a refinement, the photocatalytic metal oxide includes particles having an average particle size greater than or equal to, in increasing order of preference, 1 nm, 10 nm, 20 nm, and 30 nm. In another refinement, the photocatalytic metal oxide includes particles having an average particle size less than, in increasing order of preference, 70 nm, 60 nm, and 50 nm. In still another refinement, the photocatalytic metal oxide includes particles having a maximum Feret diameter greater than or equal to, in increasing order of preference, 1 nm, 10 nm, 20 nm, and 30 nm. In yet another refinement, the photocatalytic metal oxide includes particles having an average particle size less than, in increasing order of preference, 80 nm, 70 nm, 60 nm, and 50 nm. Advantageously, the compositions of the invention are useful in forming coatings with a very high environmental cleaning effect and a very high antifouling effect.

In another variation, the composition for forming a hydrophilic coating also includes a solvent which assists in coalescing the components. Typically, the solvent is present in about 0.01 to about 5 percent of the total weight of the composition. Suitable solvents include water miscible solvents that can change the polarity of the liquid phase of the composition. As those in the art appreciate, solvents may provide preferable functions during the film forming such as control of the drying time. Examples of solvents that may be employed include, but are not limited to glycols, ethylene glycol, propylene glycol, triglycol, and/or coalescing agents for softening and fusing the latex particles to form a film, such as Loxanol® by BASF, DAPRO® by Elementis, glycol ethers, Texanol, Velate®, Optifilm Enhancer products by Eastman Chemical, EPS® by EPS, Inc., and combinations thereof.

The composition for forming a hydrophilic coating also includes one or more optional additives. Examples of such additives include, but are not limited to, defoamers, wetting agents, and rheology modifiers. Typically, the combined weight percent of the additive is less than 10 percent of the combined weight of the inorganic binder, organic binder, and the photocatalyst (or the total weight of the composition). The addition of a defoamer to the composition aids in the removal of air bubbles, which may subsequently form into air-voids in the cured clear-coat paint. There are many commercial defoamer products available on the market, which include, but are not limited to BYK® defoamers by BYK-Chemie, Drewplus® defoamer by Ashland, EFCA® by BASF, Tego® FOAMEX by Evonik, Rhodoline® defoamers by Rhodia, and combinations thereof. Wetting agents include surfactants and dispersants. Examples of common wetting and dispersing agents include, but are not limited to, Surfynol® surfactant by Air Products, Dextrol® surfactants by Ashland, Diserbyk® dispersant products by BYK-Chemie, Tamol® dispersant products by Dow Chemical, and combinations thereof.

Rheology modifiers control the viscosity of the composition for forming of a hydrophilic film. Examples of suitable rheology modifiers include, but are not limited to, Aquaflow® nonionic synthetic associative thickener by Ashland, Natrosol® associative cellulosic thickener by Ashland, Acrysol™ DR-HASE thickener, and Acrysol™ HEUR thickener by Dow Coating Materials, DSX® non-ionic rheology modifier by BASF, Optiflo® nonionic hydrophobe modified polymeric thickener by Southern Clay Products, and combinations thereof.

The composition for forming a hydrophilic coating can be applied to a substrate by a variety of methods including dip, spin, spray, sponge, roller, or ink jet printing. The substrate will often determine the best coating method.

In another embodiment, an article coated with a layer formed from the composition set forth above is provided. The article includes a substrate and a coating disposed over the substrate. In particular, the coating is a clear-coat coating having a visible transmission greater than 90%. In a refinement, the coatings have a visible transmission from about 90% to about 98%. In another refinement, the coatings have a visible transmission from about 90% to about 96%. As set forth above, the coating includes an organic binder or residue thereof having an average particle size from about 1 to about 100 nm, an inorganic binder or residue thereof having an average particle size from about 1 to about 40 nm, and an inorganic photocatalyst or residue thereof that catalyzes an oxidation-reduction reaction. The inorganic photocatalyst includes a photocatalytic metal oxide having an average particle size from about 1 to about 50 nm. Characteristically, the coating has a contact angle less than about 10 degrees. The coatings advantageously form air-voids with small average dimensions upon exposure to ultraviolet radiation thereby maintaining the clarity of the layers. In a refinement, the majority of the air-voids have a maximum Feret diameter less than, in increasing order of preference, 300 nanometers, 200 nanometers, 100 nanometers, 50 nanometers, 25 nanometers, 15 nanometers. In another refinement, the clear-coat paint is substantially free of air-voids in order to maximize visible light transmission, hydrophilicity, and dirt adherence resistance. Therefore, the clear-coat paint has an air-void number density such that a SEM cross section of the clear-coat paint reveals less than about 1,000 per square centimeter, about 500 per square centimeter, and less than about 50 per square centimeter. In this regard clear-coat paint has air-void volume less than about 20%, about 15%, about 10%, about 5%, about 3%, about 1%, about 0.5%, about 0.2%, about 0.1%, and about 0.01%.

The details of the organic binder, the inorganic binder, and the inorganic photocatalyst as used in the coating are the same as those set forth above. In a refinement, the amount of organic binder and inorganic binder are each independently from about 20 to about 80 percent of the combined weight of the inorganic binder, organic binder, and photocatalyst. In another refinement, the amount of organic binder and inorganic binder are each independently from about 30 to about 70 percent of the combined weight of the inorganic binder, organic binder, and photocatalyst. In still another refinement, the amount of organic binder and inorganic binder are each independently from about 40 to about 60 percent of the combined weight of the inorganic binder, organic binder, and photocatalyst. Typically, the inorganic photocatalyst is present in an amount from about 2 to about 20 percent of the combined weight of the inorganic binder, organic binder, and photocatalyst. In another refinement, the amount of inorganic photocatalyst is from about 5 to about 15 percent of the combined weight of the inorganic binder, organic binder, and photocatalyst. The coating may also include residues of the additives set forth above. Typically, the combined weight percent of the additive residues is less than 10 percent of the combined weight of the inorganic binder, organic binder, and the photocatalyst.

The following examples illustrate various embodiments of the present invention. Those skilled in the art will recognize many variations that are within the spirit of the present invention and scope of the claims.

Example 1—Clear-Coat Coating Composition

Table 1 provides a representative composition for making a hydrophilic coating composition as set forth above. The three main components of this hydrophilic coating are inorganic binder, organic binder and photocatalyst, as shown in the general formulation (Table 1).

TABLE 1

| Ingredient | wet wt (g) |
| --- | --- |
| Inorganic binder | 20~80% |
| Organic binder | 20~60% |
| Photocatalytic TiO2 | 2~20% |
| Additive | 0~5% |
| water | 0~50% |
| Total | 100% |

Example 2—Clear-Coat Coating Composition

Table 2 provides a representative composition for making a hydrophilic coating composition as set forth above. The coating compatibility and stability is very critical for the clear coating to maintain clarity over its lifetime. Any flocculation of the nano materials can change the particle size distribution, and thus the assembly of the particles during the film drying process, and will eventually result in coating film whitening and chalking problems.

TABLE 2

| | wet weight (g) | solid % by weight | dry weight (g) |
| --- | --- | --- | --- |
| silica sol | 35.6 | 40% | 14.2 |
| polyurethane dispersion | 27.9 | 34% | 9.5 |
| photocatalytic TiO2 dispersion | 6.9 | 18% | 1.2 |
| water | 29.6 | 0% | 0 |
| Total (g) | 100 | | 25.0 |
| solid % | | 25% | |
| Silica/binder | | 1.5 | |
| Photocatalyst/solid | | 5% | |

Example 3—Clear-Coat Coating Composition

Table 3 provides another representative composition for making a hydrophilic coating composition as set forth above. Note the addition of 1.5% silica/binder.

Example 3—Clear-Coat Coating Composition

Table 3 provides another representative composition for making a hydrophilic coating composition as set forth above.

TABLE 3

| | wet wt (g) | solid wt % | dry wt (g) |
| --- | --- | --- | --- |
| colloidal silica | 48.0 | 30% | 14.4 |
| acrylic nano latex | 30.0 | 32% | 9.6 |
| photocatalytic TiO2 dispersion | 7.0 | 18% | 1.3 |
| Total (g) | 8.50 | | 25.3 |
| solid % by weight | | 30% | |
| Silica/binder | | 1.5 | |
| Photocatalyst/solid | | 5% | |

Example 4—Clear-Coat Coating Composition

Table 4 provides another representative composition for making a hydrophilic coating composition as set forth above.

TABLE 4

| | wet wt (g) | solid wt % | dry wt (g) |
| --- | --- | --- | --- |
| colloidal silica | 40.0 | 30% | 12.0 |
| acrylic latex | 16.0 | 50% | 8.0 |
| coalecent | 0.5 | 30% | 0.2 |
| photocatalytic TiO2 dispersion | 5.9 | 18% | 1.1 |
| Total (g) | 62.4 | | 21.2 |
| solid % by weight | | 34% | |
| Silica/binder | | 1.5 | |
| Photocatalyst/solid | | 5% | |

Example 5—Clear-Coat Coating Composition

Table 5 provides another representative composition for making a hydrophilic coating composition as set forth above. Inorganic nanoparticles and photocatalytic metal oxide particles normally have hydrophobic surface. Surface treatment of these particles with silane coupling agents can modify the surface characteristic to make it easier to disperse into a water-based coating system. These silane coupling agents have methoxy and ethoxy groups on one end which can attach to the inorganic particle surface by —Si—O—Si— bond on silica particles, or —Si—O-M- on metal oxide particles, and form a single layer on the particle, and the other end has functional groups providing hydrophilic properties and/or reactivity with other components in the coating system. For example, Dow Corning® Z-6011 Silane, Aminopropyltriethoxysilane $H_2NC_3H_6$—$Si(OC_2H_5)_3$, Dow Corning® Z-6020 Silane, N-(β-aminoethyl)-γ-aminopropyltrimethoxysilane, Dow Corning® Z-6040 Silane 3-glycidoxypropyltrimethoxysilane, etc.

TABLE 5

|  | wet wt (g) | solid wt % | dry wt (g) |
|---|---|---|---|
| silane modified colloidal silica | 19.6 | 36% | 7.0 |
| acrylic nano latex | 22.0 | 32% | 7.0 |
| silane modified photocatalytic TiO2 | 59.8 | 8% | 4.8 |
| Total (g) | 101.4 |  | 18.8 |
| solid % by weight |  | 19% |  |
| Silica/binder |  | NA |  |
| Photocatalyst/solid |  | NA |  |

Example 6—Preparation of a Simple Composition of a Superhydrophilic Coating

The simplest formula is provided in Table 2 to provide guidance for putting together the main components, and hence additives were skipped in the table. To make this simple formula shown in Table 2, a VWR VOS16 electric overhead stirrer and a 4-leaf propeller mixing blade were used. First, add the silica sol in the container, start the stirrer to get good mixing at the scale of 4 or above on the dial. While mixing, slowly add in the organic binder, mix for about 5 minutes to get a uniform mixture, and then add in the photocatalytic $TiO_2$ dispersion, mix for about 5 to about 10 minutes to get clear or translucent dispersion, water was added as the last item to balance the formula to the desired solid content. Continue mixing for another 10 minutes to finish.

Figure 2:
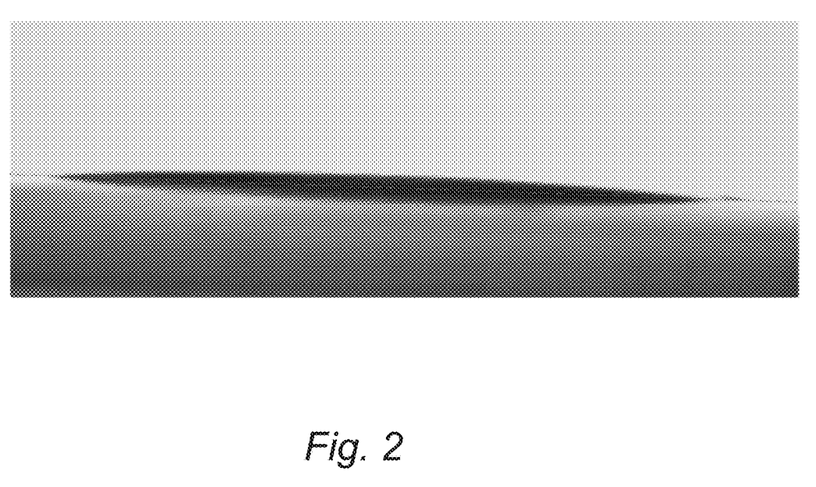
FIG. 2 provides an image of water contacting a substrate (i.e., a microscope glass slide) coated with a superhydrophilic coating.
Figure 3:
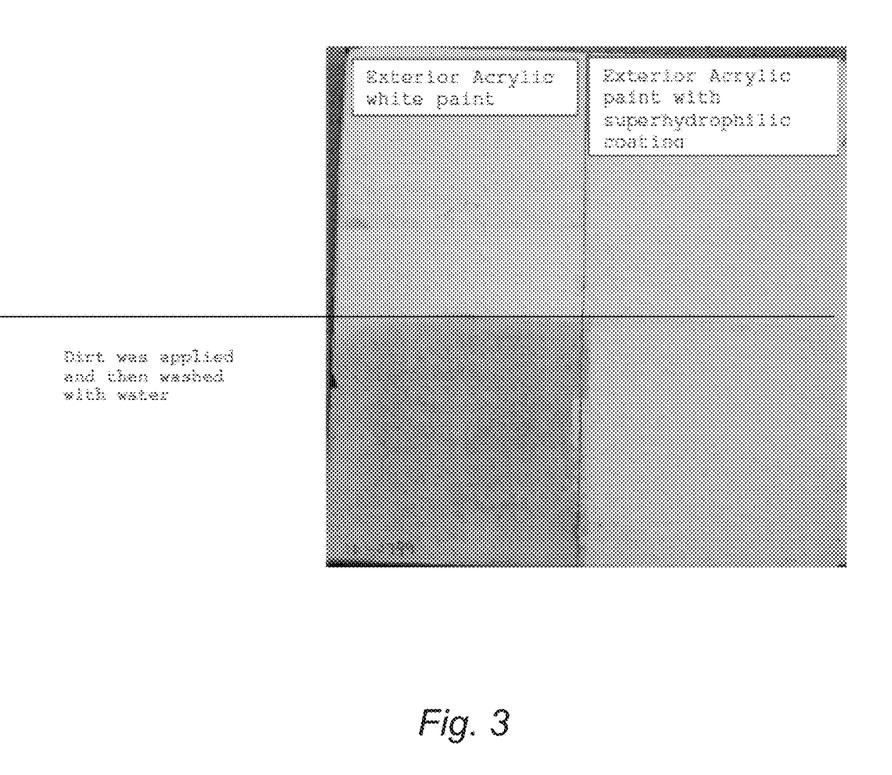
FIG. 3 provides an image of dirt pick up and dirt resistance on a substrate coated with the superhydrophilic coating.

The clear-coat coating dries to a clear film under ambient conditions. After sun irradiation, the clear film maintains its clarity and exhibits super-hydrophilicity with very low contact angle (See film clarity in FIG. 1 and water contact angle<5 in FIG. 2) and superior dirt pick up resistance (FIG. 3).

Figure 1A:
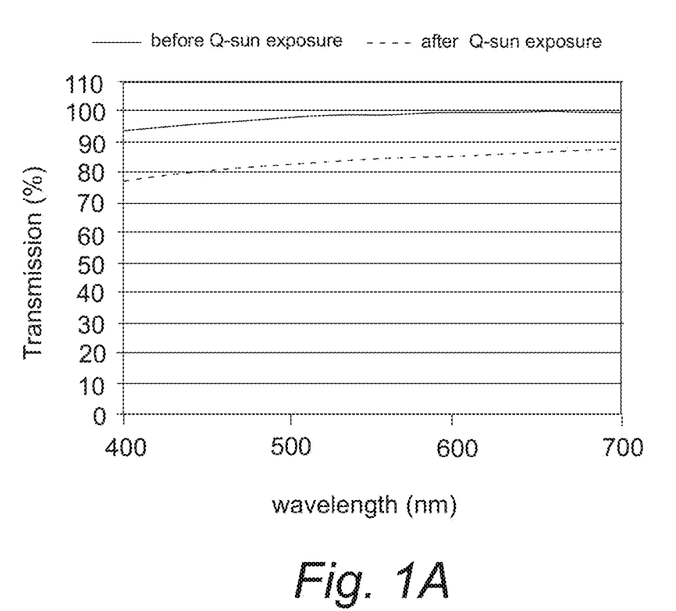
FIG. 1A provides a plot of the optical transmission of a prior art clear-coat demonstrating loss of clarity after sun exposure.
Figure 1B:
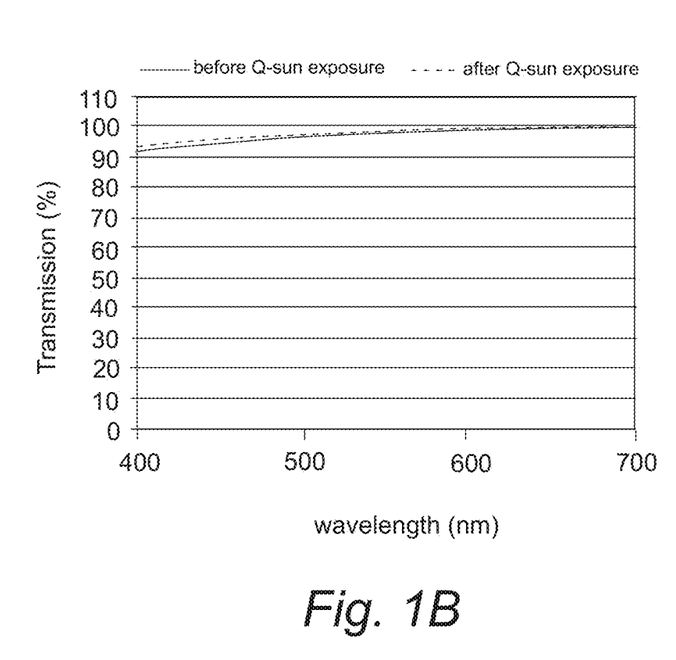
FIG. 1B provides a plot of the optical transmission of a clear-coat demonstrating the loss of clarity of a clear coat of an embodiment of the invention after sun exposure.

FIGS. 1A and 1B provide plots of the visible transmission from about 400 nm to about 700 nm. The hydrophilic clear-coat film is observed to have a transparency greater than 90% as determined by measuring the absorbance in this wavelength range. In FIG. 1B, it is noted that the clear-coat film exposed to UV radiation for 64 hours does not decrease the clear-coat paint transparency.

Clarity measurement shown in FIG. 1 is performed as follows: (i) cast a coating film at 38 um wet film thickness on clear glass slide, (ii) allow it to dry at room temperature overnight; (iii) the light transmission of the film in 400-700 nm was measured with Perkin Elmer Lambda 950 UV-Vis spectrometer; (iv) the same film was then exposed to UV rays in Q-Sun Xenon test chamber, with irradiance at 340 nm at intensity of 0.55 $W/m^2$ for recorded hours to achieve superhydrophilic property. The transmission of the exposed film was measured by UV-Visible spectrometer in 400-700 nm, and compared to its transmission before the Q-Sun exposure. The clarity of the film can also be assessed by visual observation when used on the tinted paint surface. If the film remains clear after the exposure, the true color will show through; otherwise, the visible whitening will disguise the true color.

Acrylic, styrene acrylic, polyurethane dispersion, and acrylic-polyurethane dispersion of different particle size were tested in the comparable formula, 60:40 inorganic: organic binder ratio, 5% $TiO_2$ loading. All coatings are visually clear before the weathering test. After accelerated weathering in Q-Sun for 64 hours, it was found that nano-sized organic binder showed better clarity.

$TiO_2$ loading determines the time to reach superhydrophilic property. It was observed that the higher loading of photocatalytic $TiO_2$ can shorten the time to reach superhydrophilic film property. For example, 15% $TiO_2$ has a shortened time to reach superhydrophilic film property than 10% $TiO_2$; likewise, 10% $TiO_2$ has a shortened time to reach superhydrophilic film property than 5% $TiO_2$.

To understand the reason why the invention clear coat can maintain its clarity after exposure but regular clear coat becomes milky white, scanning electron microscope (SEM) images were taken on a coating made with nano materials and a coating made with a normal acrylic resin before and after exposure.

Figure 4:
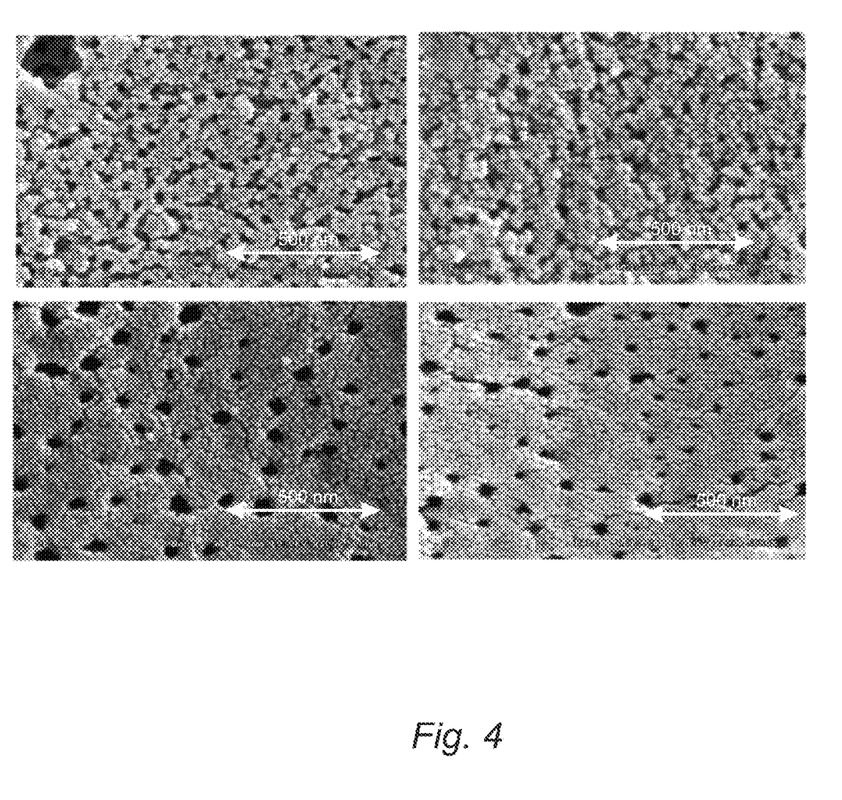
FIG. 4 provides a scanning electron micrograph of the surface of a clear coat formed from a composition having nano-sized components.

Comparing the SEM images of the invention clear coat (top images, FIG. 4) and prior art clear coat (lower images, FIG. 4), larger air voids are observed in the regular clear coat. After exposure in the Q-Sun Xenon test chamber for 5 days, the organic binder gets degraded by the photocatalytic material and leaves air-voids in the film. The prior art clear coat have bigger air-voids than the coating made with nano materials, and that causes the prior art clear coat to turn milky white while the invention clear coat stays clear. Sample 20111102-A has been exposed to Q-sun chamber for up to 14 days. The coating films look good, no chalking and no cracking was observed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. A composition for forming a hydrophilic coating comprising:
water in an amount from about 5 to 40 percent of the total weight of the composition;
an organic binder having an average particle size greater than 10 nm and less than 60 nm, the organic binder being selected from the group consisting of acrylics, polyurethane dispersions, solution polymers, styrene acrylate dispersions, urethane-acrylic hybrid dispersions, aliphatic polyurethane dispersions, acrylic dispersions, and combinations thereof;
an inorganic binder having an average particle size from about 1 to about 40 nm wherein the inorganic binder is selected from the group consisting of colloidal silicas, silica sols, silicates, and combinations thereof;
an inorganic photocatalyst that catalyzes an oxidation-reduction reaction, the inorganic photocatalyst including a photocatalytic metal oxide having an average particle size from about 1 to about 50 nm; and
a solvent selected from the group consisting of glycols, ethylene glycol, propylene glycol, triglycol, and combinations thereof, the solvent being present in an amount from about the solvent is present in about 0.01 to about 5 percent of the total weight of the composition.

2. The composition of claim 1 wherein the inorganic binder is present in an amount from about 20 to about 80 percent of the combined weight of the organic binder, the inorganic binder, and the inorganic photocatalyst; the organic binder is present in an amount from about 20 to about 80 percent of the combined weight of the organic binder, the inorganic binder, and the inorganic photocatalyst; and the photocatalytic metal oxide is present in an amount from about 2 to about 20 percent of the combined weight of the organic binder, the inorganic binder, and the inorganic photocatalyst.

3. The composition of claim 1 wherein the weight ratio of the inorganic binder to organic binder is from about 1:2 to about 4:1.

4. The composition of claim 1 wherein the inorganic binder has an average particle size from about 1 to about 20 nm, and the photocatalytic metal oxide has an average particle size from about 1 to about 20 nm.

5. The composition of claim 1 wherein the photocatalytic metal oxide is selected from the group consisting of zinc oxide, silicon dioxide, aluminum oxide, antimony oxide, titanium oxide, indium oxide, tin oxide, zirconium oxide, lead oxide, iron oxide, calcium silicate, magnesium oxide, niobium oxide, cerium oxide, composite oxides of these, and combinations thereof.

6. The composition of claim 1 wherein the photocatalytic metal oxide is titanium oxide and present in an amount between about 0.1 to about 20 percent of the total weight of the composition.

7. The composition of claim 1 further comprising an additive with at least one component selected from the group consisting of a solvent, a defoamer, a wetting agent, and a rheology modifier, wherein the additive is present in about 0.1 to about 5 percent of the total weight of the composition.

8. An article comprising:
a substrate; and
a coating disposed over the substrate, the coating having a contact angle less than about 5 degrees, the coating including
an organic binder having an average particle size greater than 10 nm and less than 60 nm, the organic binder being selected from the group consisting of acrylics, polyurethane dispersions, solution polymers, styrene acrylate dispersions, urethane-acrylic hybrid dispersions, aliphatic polyurethane dispersions, acrylic dispersions, and combinations thereof;
an inorganic binder having an average particle size from about 1 to about 40 nm wherein the inorganic binder is selected from the group consisting of colloidal silicas, silica sols, silicates, and combinations thereof, the inorganic binder including particles treated with a silane coupling agent; and
an inorganic photocatalyst that catalyzes an oxidation-reduction reaction, the inorganic photocatalyst including a photocatalytic metal oxide having an average particle size from about 1 to about 50 nm, wherein the organic binder is present in an amount from about 30 to about 70 percent of the combined weight of the inorganic binder, organic binder, and photocatalyst;
the inorganic binder is present in an amount from about 40 to about 60 percent of the combined weight of the inorganic binder, organic binder, and photocatalyst; and
the inorganic photocatalyst is present in an amount from about 5 to about 15 percent of the combined weight of the inorganic binder, organic binder, and photocatalyst.

9. The article of claim 8 wherein the weight ratio of the inorganic binder to organic binder is from about 1:2 to about 4:1.

10. The article of claim 8 wherein the inorganic binder has an average particle size from about 1 to about 20 nm, and the photocatalytic metal oxide has an average particle size from about 1 to about 20 nm.

11. The article of claim 8 wherein the photocatalytic metal oxide is selected from the group consisting of zinc oxide, silicon dioxide, aluminum oxide, antimony oxide, titanium oxide, indium oxide, tin oxide, zirconium oxide, lead oxide, iron oxide, calcium silicate, magnesium oxide, niobium oxide, cerium oxide, composite oxides of these, and combinations thereof.

12. The article of claim 8 wherein the photocatalytic metal oxide is titanium oxide.

13. The composition of claim 1 wherein the organic binder has an average particle size greater than 30 nm and less than 50 nm.

14. The article of claim 8 wherein the organic binder has an average particle size greater than 30 nm and less than 50 nm.

15. The composition of claim 1 wherein the composition forms a clear-coat coating having a visible transmission greater than 90%.

16. The composition of claim 1 wherein the composition forms a clear-coat coating having a visible transmission from about 90% to about 98%.

17. The article of claim 8 wherein the coating is a clear-coat coating having a visible transmission greater than 90%.

18. The article of claim 8 wherein the coating is clear-coat coating having a visible transmission from about 90% to about 98%.

19. The composition of claim 1 wherein the inorganic binder and the photocatalytic metal oxide each independently include particles treated with a silane coupling agent.

20. The article of claim 8 wherein the photocatalytic metal oxide each independently includes particles treated with a silane coupling agent.

21. The composition of claim 1 wherein:
the organic binder is present in an amount from about 30 to about 70 percent of the combined weight of the inorganic binder, organic binder, and photocatalyst;
the inorganic binder is present in an amount from about 40 to about 60 percent of the combined weight of the inorganic binder, organic binder, and photocatalyst; and
the inorganic photocatalyst is present in an amount from about 5 to about 15 percent of the combined weight of the inorganic binder, organic binder, and photocatalyst.

* * * * *